US012544666B2

(12) United States Patent
Afram

(10) Patent No.: US 12,544,666 B2
(45) Date of Patent: Feb. 10, 2026

(54) METHOD AND APPARATUS PROVIDING A COMPUTER IMPLEMENTED GAME

(71) Applicant: KING.COM LIMITED, St. Julians (MT)

(72) Inventor: Issa Afram, Stockholm (SE)

(73) Assignee: KING.COM LIMITED, St. Julian's (MT)

( * ) Notice: Subject to any disclaimer, the term of this patent is extended or adjusted under 35 U.S.C. 154(b) by 278 days.

(21) Appl. No.: 18/339,329

(22) Filed: Jun. 22, 2023

(65) Prior Publication Data

US 2024/0424395 A1 Dec. 26, 2024

(51) Int. Cl.
*A63F 13/537* (2014.01)
*A63F 13/80* (2014.01)

(52) U.S. Cl.
CPC ............ *A63F 13/537* (2014.09); *A63F 13/80* (2014.09)

(58) Field of Classification Search
CPC .... G07F 17/3265; G07F 17/34; A63F 13/537; A63F 13/80; A63F 13/60
See application file for complete search history.

(56) References Cited

U.S. PATENT DOCUMENTS 5,769,716 A * 6/1998 Saffari ................ G07F 17/3265 463/20
6,093,104 A * 7/2000 Kasahara ................ A63F 13/44 463/9
7,144,322 B2 * 12/2006 Gomez ................... G07F 17/32 463/16
7,690,985 B1 * 4/2010 Muskin ................... G07F 17/34 463/19
8,366,538 B1 * 2/2013 Saunders .............. G07F 17/326 463/31
12,296,106 B2 * 5/2025 Tsai ..................... A61N 5/0622
2004/0005919 A1 * 1/2004 Walker ................ G07F 17/3262 463/23
2004/0023714 A1 * 2/2004 Asdale .................... G07F 17/32 463/22
2005/0054441 A1 * 3/2005 Landrum ................ A63F 13/45 463/35
2006/0080175 A1 * 4/2006 Rowe ................. G06Q 30/0209 463/16
2006/0211494 A1 * 9/2006 Helfer ................. G07F 17/3211 463/30
2008/0102923 A1 * 5/2008 Esses ...................... G07F 17/34 463/20

(Continued)

*Primary Examiner* — Steve Rowland
(74) *Attorney, Agent, or Firm* — Holzer Patel Drennan

(57) ABSTRACT

A computer device provides a computer implemented game. The computer device has a display which displays a first plurality of selectable options, each option of the first plurality of selectable options associated with the providing of a plurality of game elements at defined positions on a game board of the computer implemented game. A user interface detects user input when a user selects one of the first plurality of selectable options. At least one processor, in response to the user input selecting one of the first plurality of selectable options, provides the plurality of game elements associated with the selected option at the respective defined positions on the game board to provide a first game board, the first game board comprising the plurality of game elements associated with the selected option and a plurality of game elements of a first type.

17 Claims, 10 Drawing Sheets

(56) References Cited

U.S. PATENT DOCUMENTS

| | | | | |
|---|---|---|---|---|
| 2008/0194315 | A1* | 8/2008 | Seelig | G07F 17/32<br>463/20 |
| 2009/0117989 | A1* | 5/2009 | Arezina | G07F 17/323<br>463/20 |
| 2009/0118004 | A1* | 5/2009 | Hoffman | G07F 17/3248<br>463/31 |
| 2009/0137309 | A1* | 5/2009 | Thomas | G07F 17/3211<br>463/20 |
| 2010/0004048 | A1* | 1/2010 | Brito | G07F 17/3265<br>463/20 |
| 2010/0004050 | A1* | 1/2010 | Caputo | G07F 17/3265<br>463/20 |
| 2011/0045906 | A1* | 2/2011 | Berman | G07F 17/3202<br>463/43 |
| 2011/0053675 | A1* | 3/2011 | Aoki | G07F 17/3211<br>463/20 |
| 2011/0086695 | A1* | 4/2011 | Evans | G07F 17/32<br>463/43 |
| 2014/0235338 | A1* | 8/2014 | Hansson | A63F 13/533<br>463/31 |
| 2014/0315616 | A1* | 10/2014 | Avin | G07F 17/34<br>463/20 |
| 2020/0254342 | A1* | 8/2020 | Israney | A63F 13/795 |
| 2020/0294361 | A1* | 9/2020 | Peterson | G07F 17/3265 |

* cited by examiner

Figure 9

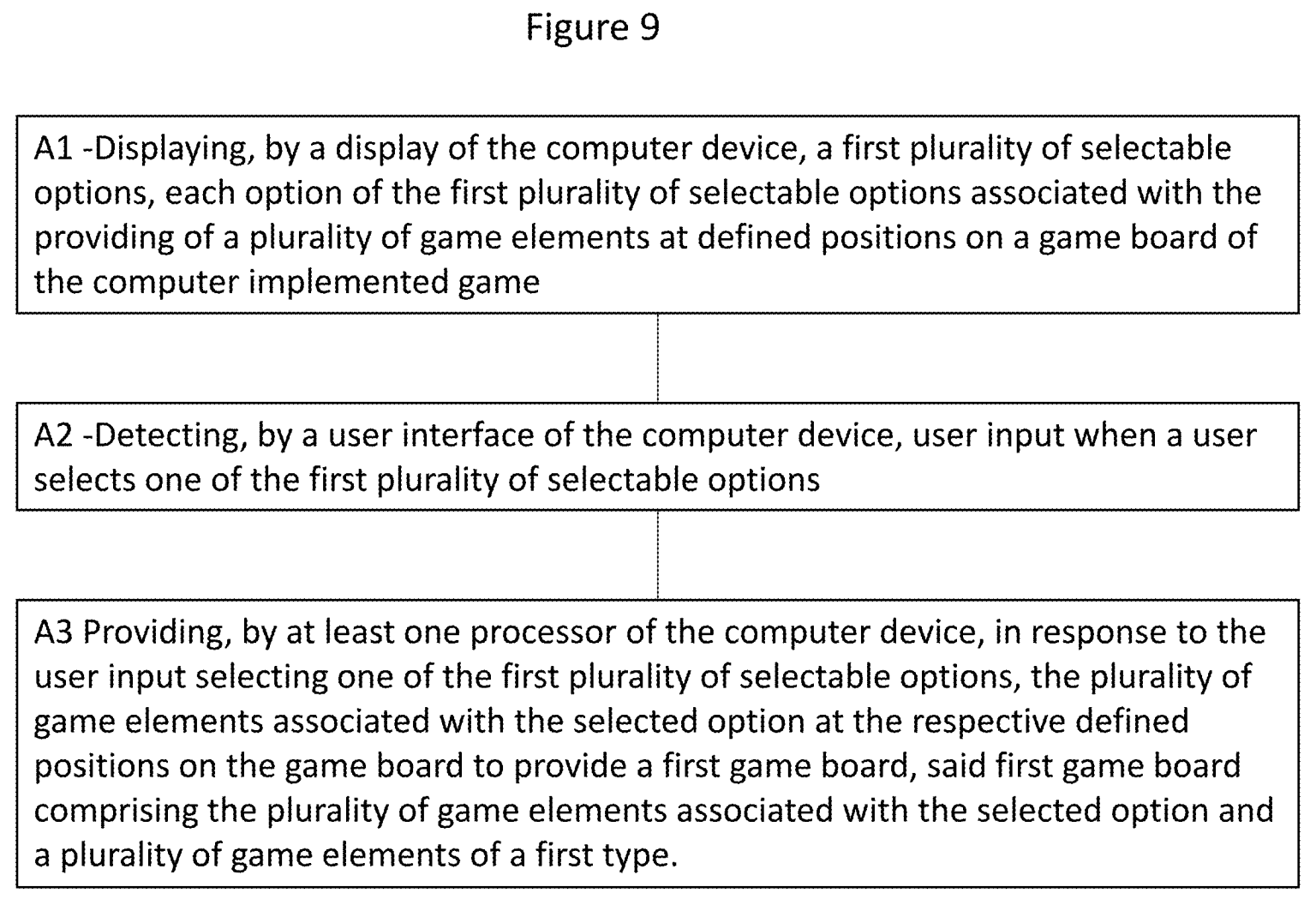

A1 -Displaying, by a display of the computer device, a first plurality of selectable options, each option of the first plurality of selectable options associated with the providing of a plurality of game elements at defined positions on a game board of the computer implemented game A2 -Detecting, by a user interface of the computer device, user input when a user selects one of the first plurality of selectable options A3 Providing, by at least one processor of the computer device, in response to the user input selecting one of the first plurality of selectable options, the plurality of game elements associated with the selected option at the respective defined positions on the game board to provide a first game board, said first game board comprising the plurality of game elements associated with the selected option and a plurality of game elements of a first type.

METHOD AND APPARATUS PROVIDING A COMPUTER IMPLEMENTED GAME

FIELD OF THE INVENTION

Embodiments of this disclosure relate to a user device configured to provide a computer implemented game.

Some embodiments may relate to engaging users or players in a computer implemented game executable in an online or offline environment.

BACKGROUND OF THE INVENTION

In the field of computer-implemented games, there are many technical challenges facing the designer of such computer implemented games when considering how, for example, the user interface is to be controlled in the context of computer devices available to play the computer implemented game.

One technical challenge can involve allowing a game to be fun and compelling even when there is limited display resource available, such as when a computer implemented game is being played on a smartphone, tablet or other minicomputer.

Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear. An existing type of match-three game is a so-called "switcher" game. In a switcher game, the player switches place of two adjacent game elements on the game board so that one or both of them create a chain of at least three adjacent game elements of the same type. Those matched game elements will then disappear. The game board is then repopulated with game objects.

One such known match three-type game is Candy Crush Saga. In that game, the game board is repopulated with game elements which are perceived as falling downwards onto the game board from the top edge of the screen from which the computer implemented game is played.

Another known type of game is "linker game", where a sequence of game elements are linked to form a known sequence.

Another type of game is a 'clicker' game, in which matches can be made in a board by clicking a group of adjacent game elements.

A technical challenge exists when allowing players to customize such match games. A technical challenge may arise for example when there is limited display resource available and/or in the providing of effective user engagement.

This patent specification describes not only various ideas and functions, but also their creative expression. A portion of the disclosure of this patent document therefore contains material to which a claim for copyright is made and notice is hereby given: Copyright King.com Limited 2023 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to one aspect, there is provided a computer device configured to provide a computer implemented game, the computer device comprising: a display configured to display, a first plurality of selectable options, each option of the first plurality of selectable options associated with the providing of a plurality of game elements at defined positions on a game board of the computer implemented game; a user interface configured to detect user input when a user selects one of the first plurality of selectable options; and at least one processor configured, in response to the user input selecting one of the first plurality of selectable options, to provide the plurality of game elements associated with the selected option at the respective defined positions on the game board to provide a first game board, the first game board comprising the plurality of game elements associated with the selected option and a plurality of game elements of a first type.

Each of the selectable options may be associated with a different blocking game element.

A first of the selectable options may be associated with a first number of a first blocking element and a second of the selectable options may be associated with a second number of a second blocking element, the first number being different to the second number.

Each of the selectable options may be associated with two different game elements.

Each of the selectable options may be associated with a booster game element and a blocker game element.

The defined positions may comprise a first set of defined positions and a second set of defined positions, a first one of the two different game elements of a respective selectable option being associated with the first set of defined positions and a second one of the two different game elements of the respective selectable option being associated with the second set of defined positions.

The at least one processor may be configured to cause the display to display a second plurality of selectable options, each option of the second plurality of selectable options associated with the providing of a plurality of game elements at defined positions on a game board of a computer implemented game; the user interface may be configured to detect user input when a user selects one of the second plurality of selectable options; and the at least one processor may be configured, in response to the user input selecting one of the second plurality of selectable options, to provide the plurality of game elements associated with the selected option at the respective defined positions on the game board to provide a second game board comprising the plurality of game elements associated with the selected option of the first plurality of options, the plurality of game elements associated with the selected option of the second plurality of options, and a plurality of game elements of a first type.

The first plurality of selectable options may be different to the second plurality of selectable options.

The defined positions associated with the first plurality of selectable options may be different to the defined positions associated with the second plurality of selectable options.

The defined positions may be provided in a single block of tiles of the game board, the block comprising a plurality of tiles.

The defined positions may be provided in in a plurality of blocks of tiles of the game board, each block comprising one or more tiles.

The user interface may be configured to detect user input when a user makes a move to play the computer implemented game on the first game board.

The user interface may be configured to detect user input selecting at least one game element on the game board to make a move, the at least one processor may be configured to determine if the move satisfies a matching criteria and if so to remove one or more of game elements satisfying the matching criteria from the game board.

The first plurality of selectable options may comprise a first round of customization of the game board, the at least one processor providing at least one round of customization, and allowing the game board to be played by a user only when the at least one round of customization has been completed.

Two or more rounds of customization may be provided.

The at least one processor may be configured to cause the first game board to be sent to at least one other user.

The at least one processor may be configured to cause the first game board to be saved in at least one memory and to allow the first game board to be replayed.

According to another aspect, there is provided computer implemented method provided by a computer device configured to provide a computer implemented game, the method comprising: displaying, by a display of the computer device, a first plurality of selectable options, each option of the first plurality of selectable options associated with the providing of a plurality of game elements at defined positions on a game board of the computer implemented game; detecting, by a user interface of the computer device, user input when a user selects one of the first plurality of selectable options; and providing, by at least one processor of the computer device, in response to the user input selecting one of the first plurality of selectable options, the plurality of game elements associated with the selected option at the respective defined positions on the game board to provide a first game board, the first game board comprising the plurality of game elements associated with the selected option and a plurality of game elements of a first type.

Each of the selectable options may be associated with a different blocking game element.

A first of the selectable options may be associated with a first number of a first blocking element and a second of the selectable options may be associated with a second number of a second blocking element, the first number being different to the second number.

Each of the selectable options may be associated with two different game elements.

Each of the selectable options may be associated with a booster game element and a blocker game element.

The defined positions may comprise a first set of defined positions and a second set of defined positions, a first one of the two different game elements of a respective selectable option being associated with the first set of defined positions and a second one of the two different game elements of the respective selectable option being associated with the second set of defined positions.

The method may comprise causing, by the at least one processor, the display to display a second plurality of selectable options, each option of the second plurality of selectable options associated with the providing of a plurality of game elements at defined positions on a game board of a computer implemented game; detecting, by the user interface, user input when a user selects one of the second plurality of selectable options; and providing, by the at least one processor, in response to the user input selecting one of the second plurality of selectable options, the plurality of game elements associated with the selected option at the respective defined positions on the game board to provide a second game board comprising the plurality of game elements associated with the selected option of the first plurality of options, the plurality of game elements associated with the selected option of the second plurality of options, and a plurality of game elements of a first type.

The first plurality of selectable options may be different to the second plurality of selectable options.

The defined positions associated with the first plurality of selectable options may be different to the defined positions associated with the second plurality of selectable options.

The defined positions may be provided in a single block of tiles of the game board, the block comprising a plurality of tiles.

The defined positions may be provided in in a plurality of blocks of tiles of the game board, each block comprising one or more tiles.

The method may comprise detecting, by the user interface, user input when a user makes a move to play the computer implemented game on the first game board.

The method may comprise detecting, by the user interface, user input selecting at least one game element on the game board to make a move, and determining, by the at least one processor, if the move satisfies a matching criteria and if so to removing one or more of game elements satisfying the matching criteria from the game board.

The first plurality of selectable options may comprise a first round of customization of the game board, the method comprising providing, by the at least one processor, at least one round of customization, and allowing the game board to be played by a user only when the at least one round of customization has been completed.

Two or more rounds of customization may be provided.

The method may comprise causing the first game board to be sent to at least one other user.

The method may comprise causing the first game board to be saved in at least one memory and to allow the first game board to be replayed.

According to another aspect, there is provided a non-transitory computer readable storage medium comprising computer executable instructions that, when executed by at least one processor of a computer device cause the computer device to: display, by a display of the computer device, a first plurality of selectable options, each option of the first plurality of selectable options associated with the providing of a plurality of game elements at defined positions on a game board of the computer implemented game; detect, by a user interface of the computer device, user input when a user selects one of the first plurality of selectable options; and provide in response to the user input selecting one of the first plurality of selectable options, the plurality of game elements associated with the selected option at the respective defined positions on the game board to provide a first game board, the first game board comprising the plurality of game elements associated with the selected option and a plurality of game elements of a first type.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Embodiments will now be described by way of the accompanying drawings in which:

FIG. 9 shows a method of some embodiments.

DESCRIPTION OF PREFERRED EMBODIMENTS

The terms user and player are used interchangeably throughout this document and no specific meaning is intended using one or the other unless the context suggests otherwise. In the following description of various implementations of the embodiments, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the computer implemented game is not exhaustive, what is described herein are certain preferred embodiments. It is possible to implement the computer implemented game in a number of variations.

Figure 4:
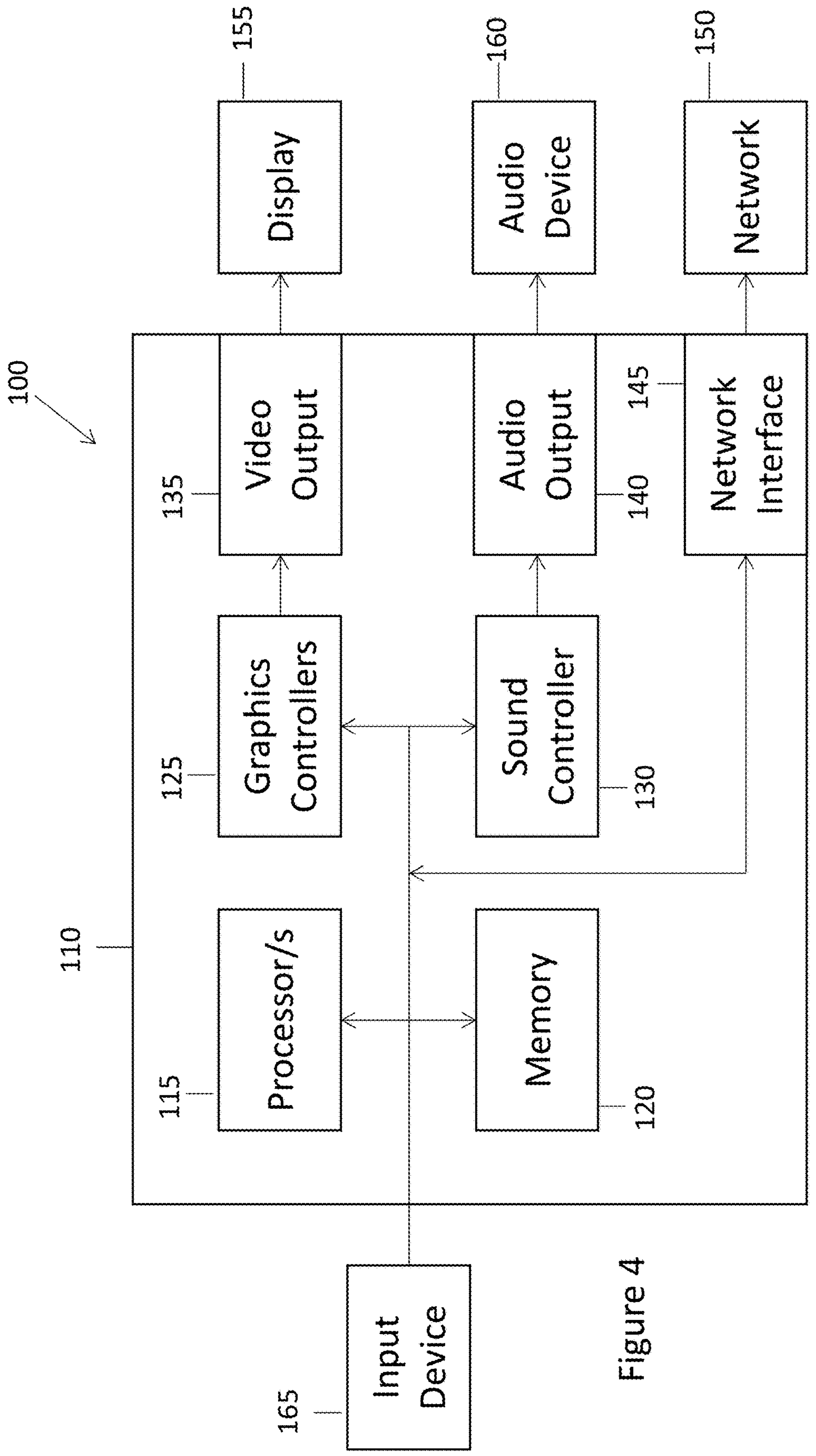
FIG. 4 shows an example user device configured to provide some embodiments.

A schematic view of a user device 100 according to an embodiment is shown in FIG. 4. All of the blocks shown are implemented by suitable circuitry. The blocks may be implemented in hardware and/or software. The user device may have a control part 110. The control part 110 is shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The control part 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the control part 110 are configured to communicate with each other by an interconnect such as a bus or any other suitable interconnect and/or by point to point communication.

It should be appreciated that in some embodiments, the control part may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 3:
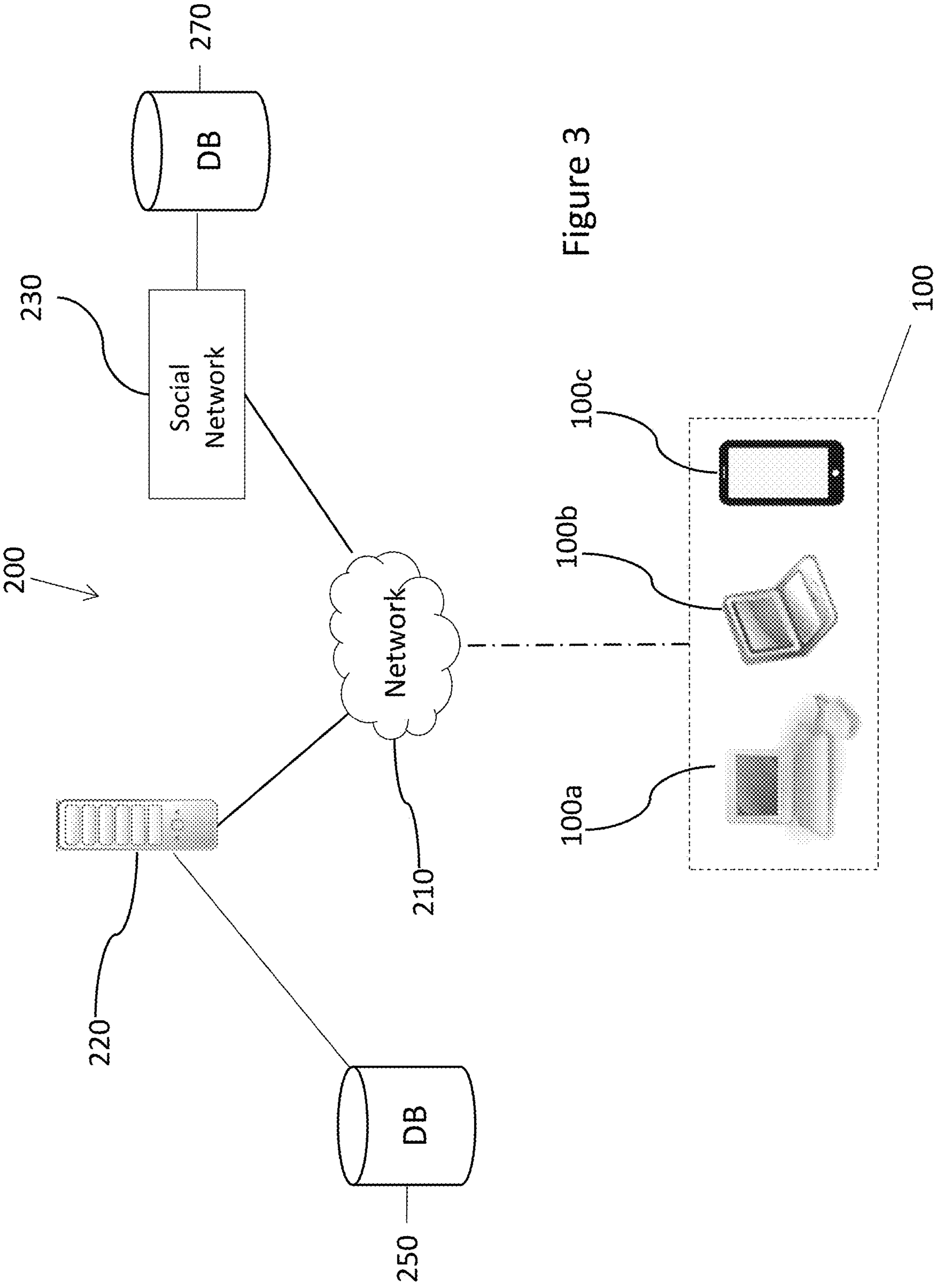
FIG. 3 shows an example system in which some embodiments may be provided.

FIG. 3 schematically shows a system 200 supporting some embodiments. The system 200 comprises a server 220 which may store or be in communication with a database 250 which may store game player's details, profiles, statistics etc. In practice, one or more databases 250 may be provided. Where more than one server 220 is provided, the database(s) 250 may be provided in one server 220 or across two or more servers. The server 220 may also have a games data function. This may comprise one or more units of memory to store the computer implemented game program and user behaviour data, and a processor to run the games program and process the user behaviour data.

The server 220 may communicate via, for instance, the internet 210 with one or more client or user devices 100, shown in FIG. 3 by way of example as user devices 100*a*, 100*b* and 100*c*. There may be connections, via the network 210, to a social network 230, for example, Facebook™. The social network 230 may also be connected to a database 270 storing for example, social user interaction details, user to user interaction maps, friend lists, location history, and/or the like. In practice, one or more databases 270 may be provided.

It should be appreciated that embodiments may be deployed in different system architectures. For example, the computer implemented game may be implemented as a computer implemented game that is stored in the memory of the user device and is run on the processor of the user device. However, the server 220 may handle some elements of the computer implemented game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the computer implemented game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as a stand-alone computer implemented game on the user device.

Figure 1:
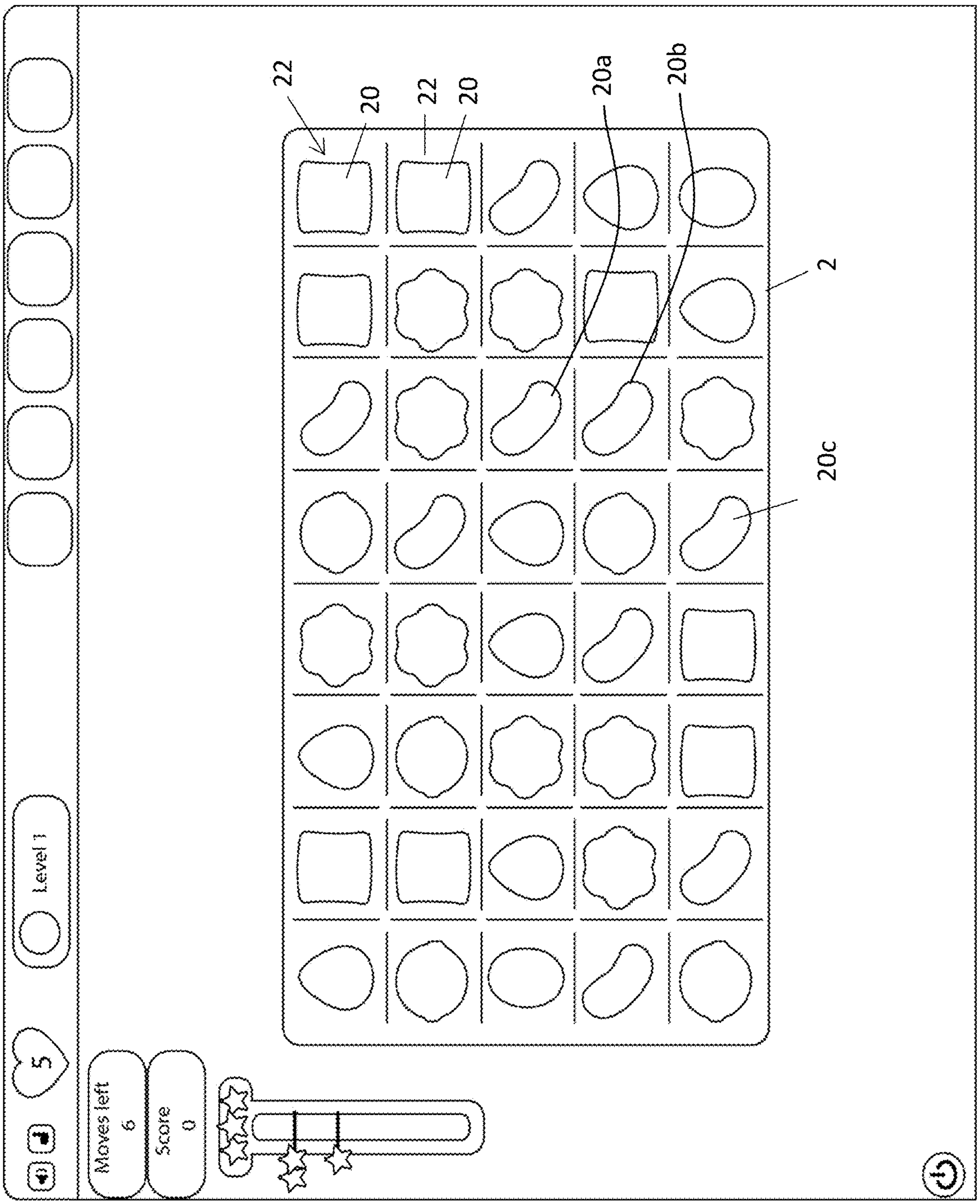
FIG. 1 is a schematic diagram of a game board of a match three computer implemented game illustrating a basic example of a match three game.

FIG. 1 shows a known version of a match 3 switcher computer implemented game called Candy Crush Saga™ which is displayed on a display of communication device. FIG. 1 illustrates a game board 2 with a plurality of game elements 20. The game elements are each of six different shapes and colours. Of course in other embodiments, there may be more or less than six different game elements. Each game element type may be defined by one or more of particular characteristics, for example a particular shape and colour combination. Each game element is supported by a tile 22.

Figure 2:
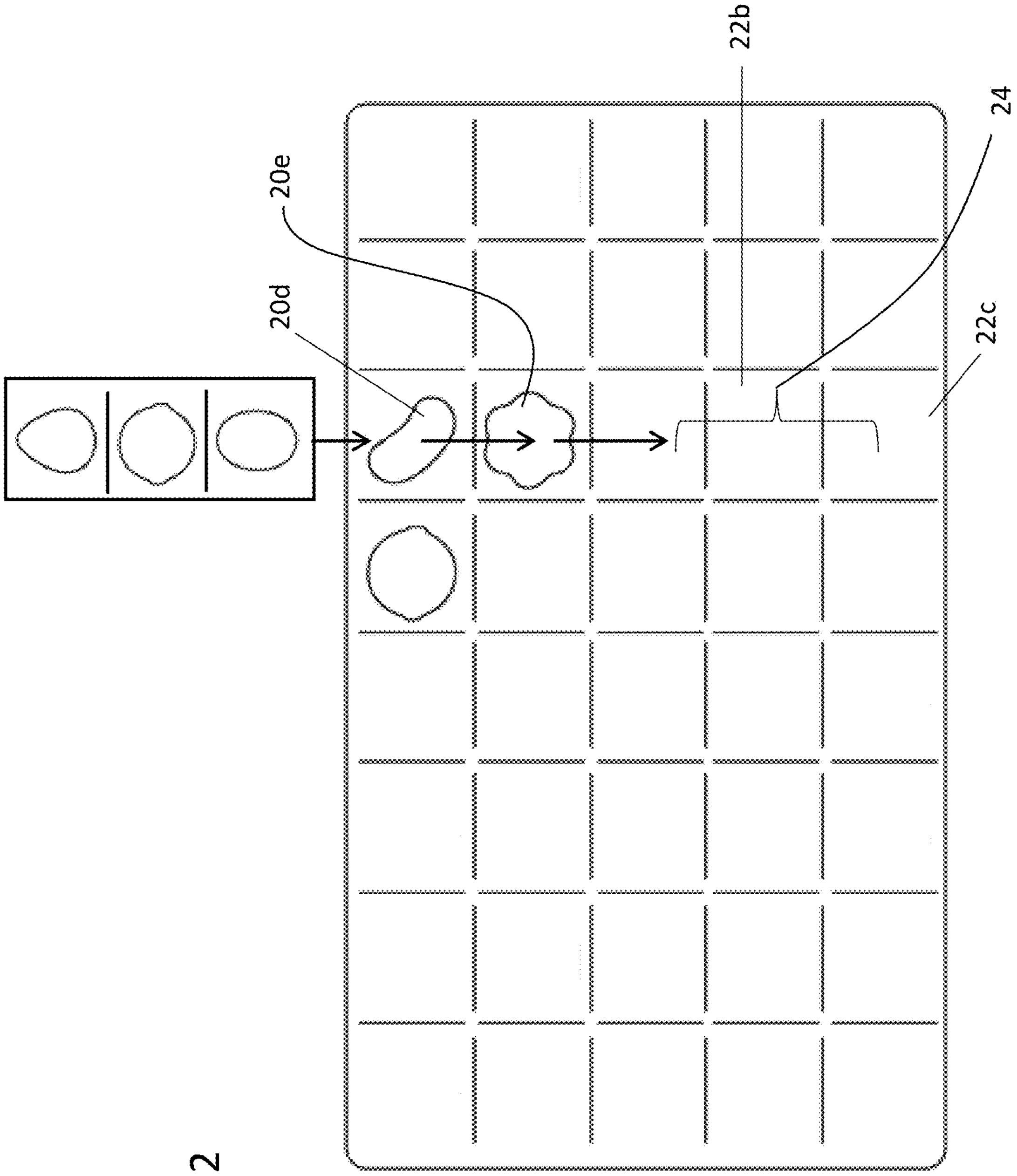
FIG. 2 is a schematic diagram illustrating how a game board of a match three computer implemented game is populated with replacement game elements.

In the known version of the match 3 switcher game, the aim of the computer implemented game is to swap game elements in the shape of candies with each other to make moves on the game board. To gain points the player has to make moves that create matches of at least three of the same game element or candy. In doing so, the player gains points and the matched game elements are removed. As a result new game elements fall into place from the top of the game board in order to fill any spaces created. Assume in FIG. 1 that game element 20*c* is moved one place to the right to form a three-line match with game elements 20*a* and 20*b*. Turning now to FIG. 2, this has the effect of game elements 20*a*, 20*b* and 20*c* being removed or "disappearing" from the game board, creating a visual effect (animation) on the screen to indicate the disappearance, such as a minimal explosion effect. The two game elements which were directly above game elements 20*a* will now fall downwards into the spaces created by the removal of game elements 20*a*, 20*b* and 20*c*. Thus, game element 20*e* will end up at the location 22*c*, and game element 20*d* will end up at the location 22*b*. In addition, three new game elements are provided and fall downwards into the game board to fill the remaining three spaces above location 22*b*. The new game elements may be generated at random. The user then has a new game board on which to make a subsequent move in the computer implemented game.

Some embodiments may use so-called physics to control movement of game elements when replenishing a game board. For example, in this computer implemented game, game elements drop down from above the game board at set speeds and from the top of the game board. In an alternative version of this game, the physics can vary so that the speed and direction of replacement game elements can alter. It should be appreciated that the game physics described are by way of example and in other embodiments any suitable game physics may be used. In some embodiments, the replenishment of a game board may be controlled without the use of game physics.

A computer implemented game may comprise one or more levels. A given level may only be playable once one or more other levels have been played and successfully completed.

In the following, a game board is made up of game positions or tiles each of which is covered by a respective game element or game object.

Some embodiments may allow a player to customize a level of a game which they are playing. One technical challenge is that this may lead to levels of the computer implemented game which may be unplayable or even too easy. Some embodiments allow a player to customize a level of a computer implemented game in such a way that allows the resulting game level to be playable. Some embodiments may increase user engagement.

In some embodiments, a player will be provided with a single round of customization. In other embodiments, the player will be provided with two or more rounds of customization. In some embodiments, the customization is provided at the beginning of the computer implemented game level, that is before the player has played that level of the game. In some embodiments, the one or more rounds of customization is completed before the player is able to play the level of the computer implemented game. In some embodiments, one or more rounds of customization may be providing during the playing of a level of the computer implemented game. In some embodiments, the user is unable to play or continue playing the computer implemented game unless the respective customization round or rounds are completed.

In some embodiments, at a start of a game level which can be customized, the player may be provided a game board which is populated with game elements. In some embodiments, there may be no boosters and/or blockers on the game board at the start of the customization. In other embodiments, there may be one or more boosters and/or one or more blockers before any customization is provided. Boosters and blockers are examples of different types of game elements.

The computer implemented game level may be associated with one or more designated or defined positions for a round of customization. The defined positions may provide one or more designated areas. The one or more defined positions are the locations on the game board where the user selected game elements may be provided, for example.

The user may be provided with two or more different options which can be selected by the user. The user may select one of these options. Each option may be associated with a different game element. Each option may be associated with two or more different game elements.

In some embodiments, a player is provided with a choice of blockers which are to be provided in the designated or defined positions. For example, the user may be provided with a choice of two or more blockers. In other words, each option is associated with a different blocker. The user may choose one of the blockers and that chosen blocker will then be provided in the designated positions.

In some embodiments, the user may be provided with a choice of two or more boosters. In other words, each option is associated with a booster. The user may choose one of the boosters and that chosen booster will then be provided in the designated positions.

An option which is selected by a user may have more than one type of game element associated with that option. For example, a given option may be associated with two different blockers, two different boosters, or a blocker and a booster. In some embodiments, there may be three or more different game elements associated with an option.

In some embodiments, the user may be provided with a choice of two options where each option comprises a booster and a blocker. The user may choose one of the options and the booster and the blocker will then be provided in the designated positions.

It should be appreciated that whilst some examples are described where the user is provided with two options, other embodiments may provide the user with three or more options.

In some embodiments, the defined positions may prevent levels which are not playable from being created.

In some embodiments, a user may be provided with two or more rounds of customization. Each round may be associated with different designated or defined positions. The options associated with each round may provide different choices in some embodiments.

Reference is made to FIGS. 5*a* to 5*e* which shows one example of the customization of a game board by a player. The player is then able to play the computer implemented game on the customised game board such as discussed in relation to FIGS. 1 and 2.

Figure 5B:
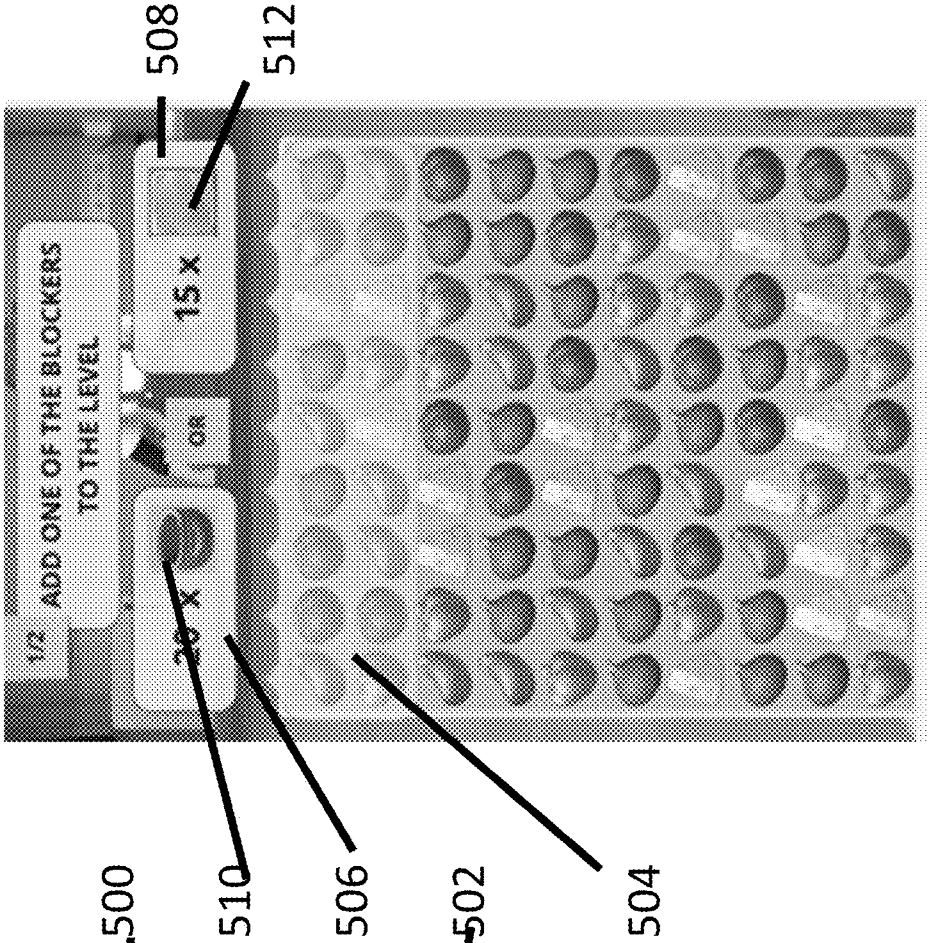
FIGS. 5*a* to 5*e* schematically illustrate the customization of a game board of a computer implemented game.
Figure 5A:
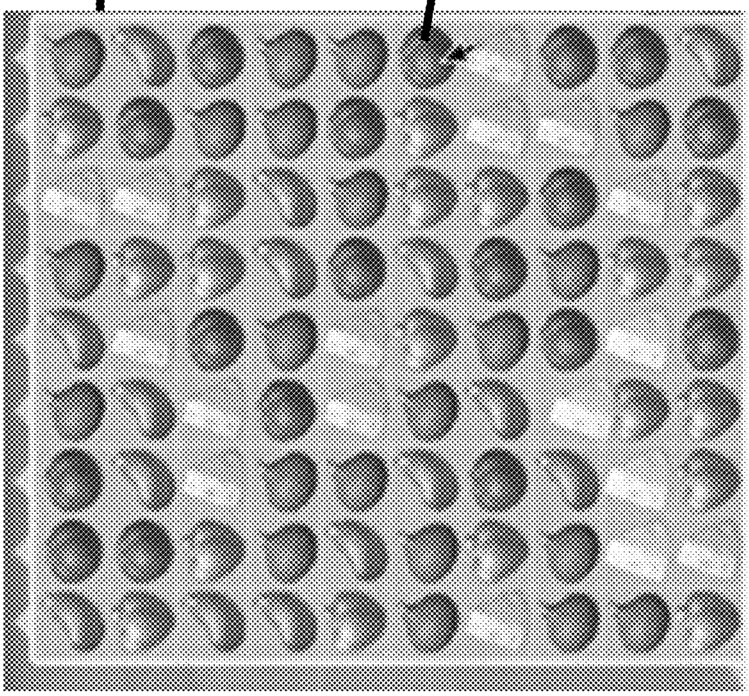

Reference is made first to FIG. 5*a* which shows a game board 500 which is filled with a first type of game elements 502. In this example, the first type of game elements 502 are visualised as vegetables and cheese. This is by way of example only and in different embodiments, the first type of game elements may be visualised differently such as candies or in any other way. FIG. 5*a* shows the game board before any customization by a player. In this example, the initial game board has no booster game elements or blocker game elements.

Reference is made to FIG. 5*b* in which an area 504 of the game board is highlighted. This area provides the defined positions. In this example, the at least one processor is configured to cause the display to display two different options 506 and 508 for a second type of game element. In this example, the different options are both associated with blockers. A so-called blocker may be static. This means that the position of the blocker game element with respect to the game board is unchanged even if, for example a first type of game element 502 located below (if the direction of replenishment is from above) that blocker is removed. In contrast, a game element of the first type will move in the game board if for example a game element below it (if the direction of replenishment is from above) is removed. It should be appreciated that one or more additional or alternative directions of replenishment may be used in different embodiments which will influence the movement of first type of game elements when game elements are removed from the game board.

In some embodiments, the blocker game element may not be static but may be able to move on the game board.

In this example, the two options are associated with the different number of blockers. In other embodiments, the two options may be associated with the same number of blockers.

For the first option 506, the user interface is configured to display a first blocker 510 and the associated number of the first blockers 510 that will be added to the highlighted area 504. In this example, the first option 506 is associated with 20 first blockers 510.

For the second option 508, the user interface is configured to display a second blocker 512 and the associated number of the second blockers 512 that will be added to the highlighted area 504. In this example, the second option 508 is associated with 15 of the second blockers 512.

The first and second blockers may have an equivalent effect in some embodiments. In other embodiments, the first and second blockers may have different effects. The second blocker may, for example, be harder to remove than the first blocker or vice versa.

The user is able to select one of the two options 506 and 508. For example, where the user interface is provided by a touch screen, the user can touch or otherwise select the area associated with the option to be selected.

Figure 5D:
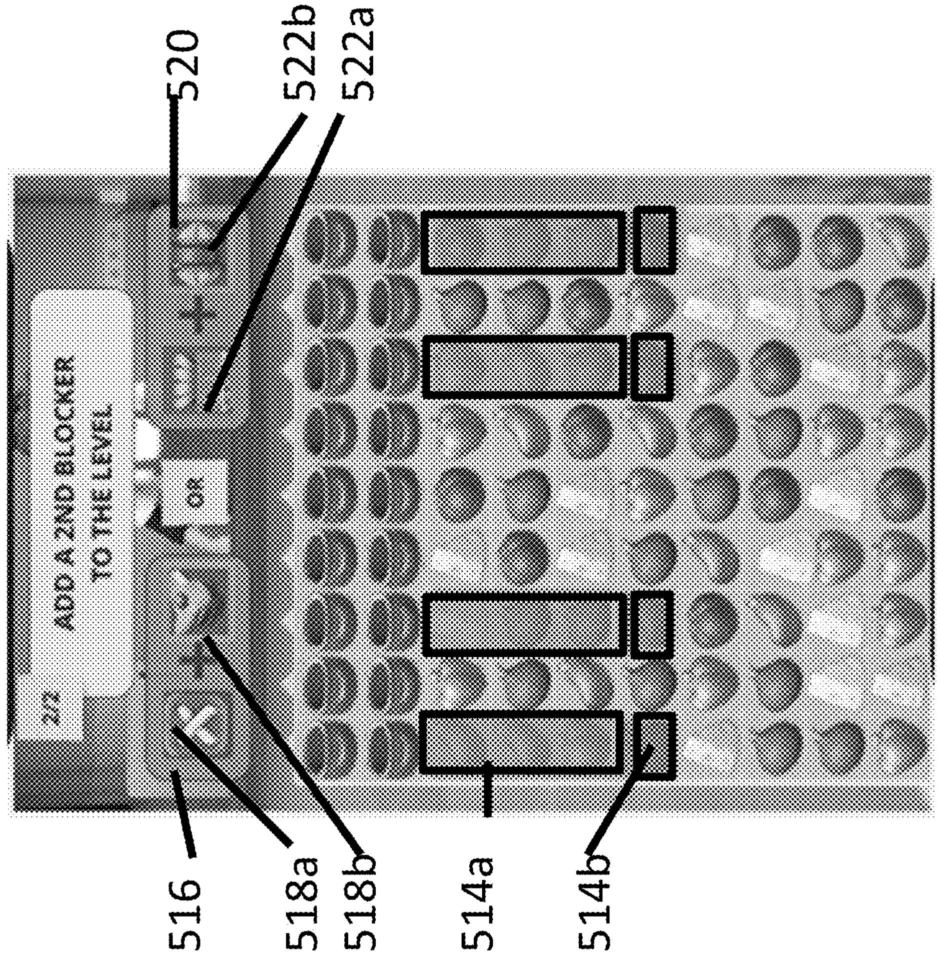
Figure 5C:
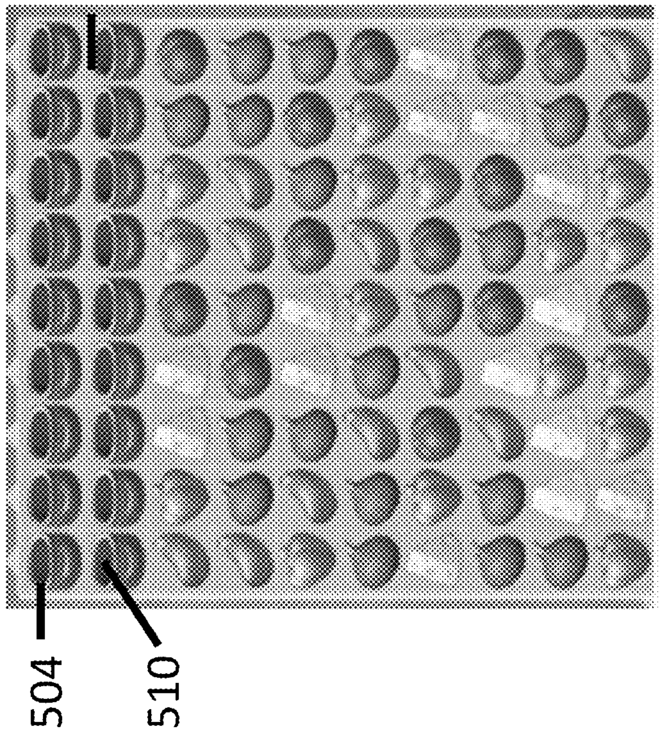

Reference is made to FIG. 5*c*. In FIG. 5*c*, the selected blocker is shown in the highlighted area. In this example, the first blocker option is the option which has been selected. Accordingly, the given number (that is 20) of the first blocker 510 associated with the first option is provided in that first area 504.

In some embodiments, the user is provided with a further round to customise the game board. In this regard, reference is made to FIG. 5*d*. In this example, two options are again provided. Each option is provided with a blocker and a booster. In the example shown in FIG. 5*d*, the first option 516 comprises a first blocker 518*a* and a first booster 518*b*. The second option 520 comprises a second blocker 522*a* and a second booster 522*b*.

The game board may comprise first areas 514*a* and second areas 514*a*. The first areas 514*a* will have the blocker options and the second areas 514*b* will have the booster options. In this example, the first areas 514*a* comprise four different areas with each area occupying an area of three tiles in a column. The second areas 514*b* is provided by four separate tiles.

A booster game object is one which provides an effect on the game board when triggered. For example, a booster game object may remove a row or column of game elements, remove one or more blocking game elements, remove one or more game elements, and change one or more game elements from one type of game element to another type of game element. It should be appreciated that these are some examples of booster game objects. Alternative or additional examples of booster game objects may be used in some embodiments.

In some embodiments, the first areas 514*a* may be highlighted in a first way with the first blockers 514*a* of the first option and the second blocker 522*a* of the second option highlighted in the same way. The highlighting may, for example, use a first colour. The second areas 514*b* may be highlighted in a second way with the first booster 514*a* of the first option and the second booster 522*b* of the second option highlighted in the same way. The first way of highlighting may be different to the second way of highlighting. The highlighting may, for example, use a second colour.

The user is able to select one of the two options 516 and 520. For example, where the user interface is provided by a touch screen, the user can touch or select the area associated with the option to be selected.

Figure 5E:
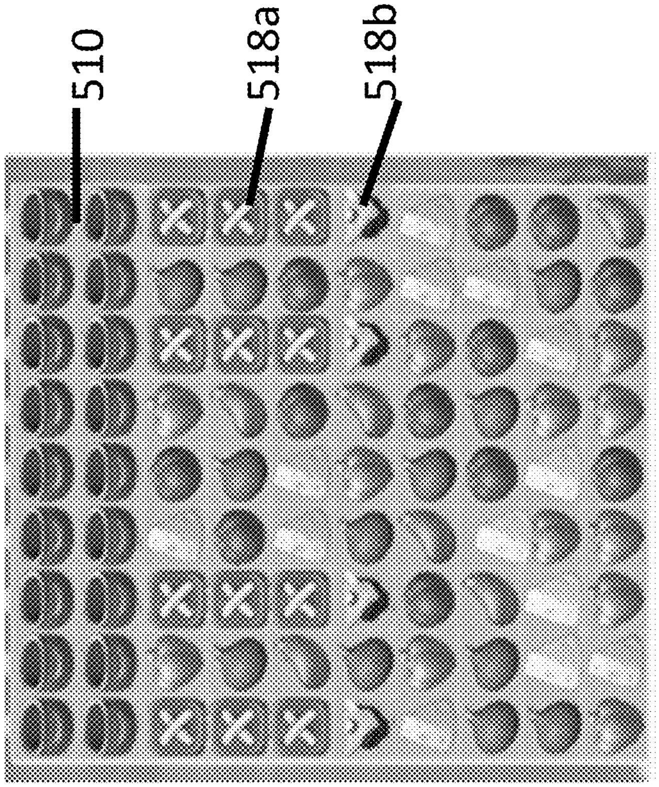

Reference is made to FIG. 5*e*. In FIG. 5*e*, the blockers and boosters of the selected option discussed in relation to FIG. 5*d*, is shown in the highlighted area. In this example, the first option 516 is the option which has been selected. Accordingly, the first blocker 518*a* associated with the first option is provided in that first area 514*a* and the first booster 518*a* associated with that same option is provided in the second areas 514*b*.

The user is then able to play the customized level.

In the previous examples, two options have been provided. In other embodiments, only one option may be provided or more than two options may be provided. The user may be required to select a single one of the options in some embodiments. In other embodiments more than one option may be selectable.

The at least one processor may be configured to provide one or more designated areas or positions on the game board where a selected option is provided. The area may be a single area such as shown in FIG. 5*b* or there may be two or more areas such as shown in FIG. 5*d*. An area can be a single tile or a plurality of tiles.

A designated area or positions can be highlighted or otherwise indicated in any suitable way. In some embodiments, a designated area may be empty of any game elements. Alternatively or additionally, a designated area may be indicated by use of colour for example. Alternatively or additionally, the designated area may “flash”.

In some embodiments, the user is able to select one or more of the indicated areas on which a selected option or the only provided option is to be provided. For example, the user may be provided with a single option and then has to select one or more areas for that single option. The user may alternatively be provided with two or more options and then has to select one or more areas for a selected option.

In some embodiments, one or more of the options may comprise a booster game element. In some embodiments, one or more of the options may comprise a blocker game element. In some embodiments, an option may comprise one or more game elements of the first type.

In some embodiments, an option may comprise one or more different game elements. When an option is selected, the one or more different game elements will be provided on the game board.

Figure 6:
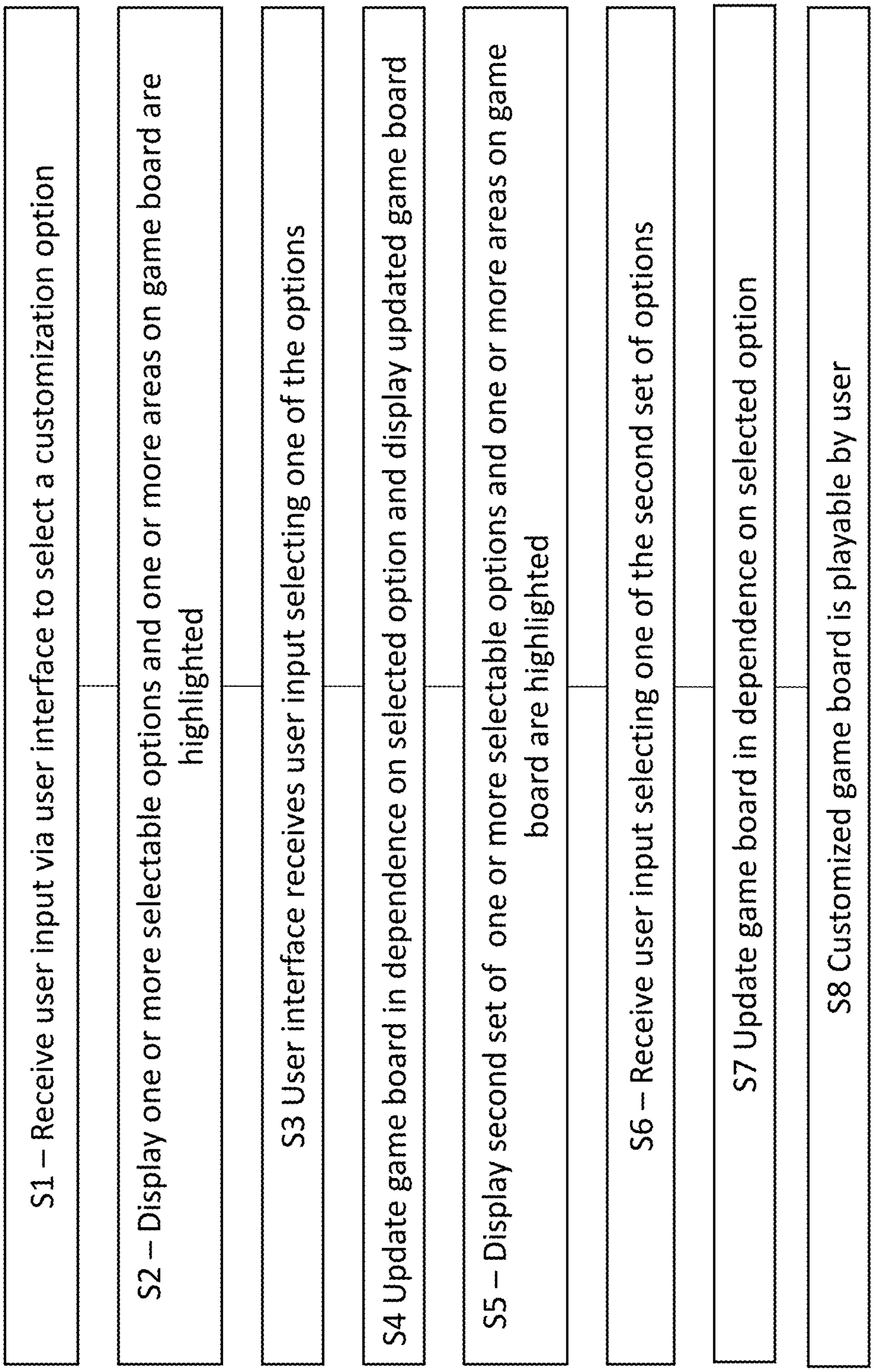
FIG. 6 schematically shows a flow chart showing steps performed by a user device.

Reference is made to FIG. 6 which shows a method according to some embodiments. The method may be performed by at least one processor in conjunction with at least one memory of the user device.

In step S1, user input is received via the user interface to select a customization option for a game board.

This may be optional. In other embodiments, the customization option may be provided when a given option or game level is selected by the player. For example, one or more game levels may be associated with customization.

In step S2, the at least one processor is configured to cause one or more selectable options to be displayed. The at least one processor is configured to cause one or more areas or designated positions on the game board to be highlighted.

In step S3, user input is received via the user interface to select one of the selectable options.

In step S4, the at least one processor is configured to cause the game board to be updated to provide the game element or game elements associated with the selected option at the highlighted area or areas on the game board. The at least one processor is configured to cause the updated game board to be displayed on the display.

In step S5, the at least one processor is configured to cause a second set of one or more selectable options to be displayed. The at least one processor is configured to cause one or more areas on the game board to be highlighted. These may be different from the areas which were highlighted previously.

In step S6, user input is received via the user interface to select one of the second set of selectable options.

In step S7, the at least one processor is configured to cause the game board to be updated to provide the game element or game elements associated with the selected option of the second set of selectable options at the highlighted area or areas on the game board. The at least one processor is configured to cause the updated game board to be displayed on the display.

Steps S5 to S7 may be optional in some embodiments.

Steps S5 to S7 may be repeated for one or more further rounds of customization.

In step S8, the at least one processor is configured to allow the user to play the computer implemented game with the customized game board. The user may only be permitted to play the level of the computer implemented when the one or more of the rounds of customization have been completed.

In some embodiments, the at least one processor is configured store the customized game board in at least one memory. The customized game board can be replayed by the user and/or shared by the user with other players. Those other players would be able to play the customized level of the computer implemented game.

Reference is made to FIG. 10 which shows a method of some embodiments.

This method may be performed by user device.

The method may be provided by computer program code or computer executable instructions.

The method may comprise as referenced A1, displaying, by a display of the computer device, a first plurality of selectable options, each option of the first plurality of selectable options associated with the providing of a plurality of game elements at defined positions on a game board of the computer implemented game.

The method may comprise as referenced A2, detecting, by a user interface of the computer device, user input when a user selects one of the first plurality of selectable options.

The method may comprise as referenced A3, providing, by at least one processor of the computer device, in response to the user input selecting one of the first plurality of selectable options, the plurality of game elements associated with the selected option at the respective defined positions on the game board to provide a first game board, the first game board comprising the plurality of game elements associated with the selected option and a plurality of game elements of a first type.

It should be appreciated that the method outlined in FIG. 10 may be modified to include any of the previously described features.

Figure 7:
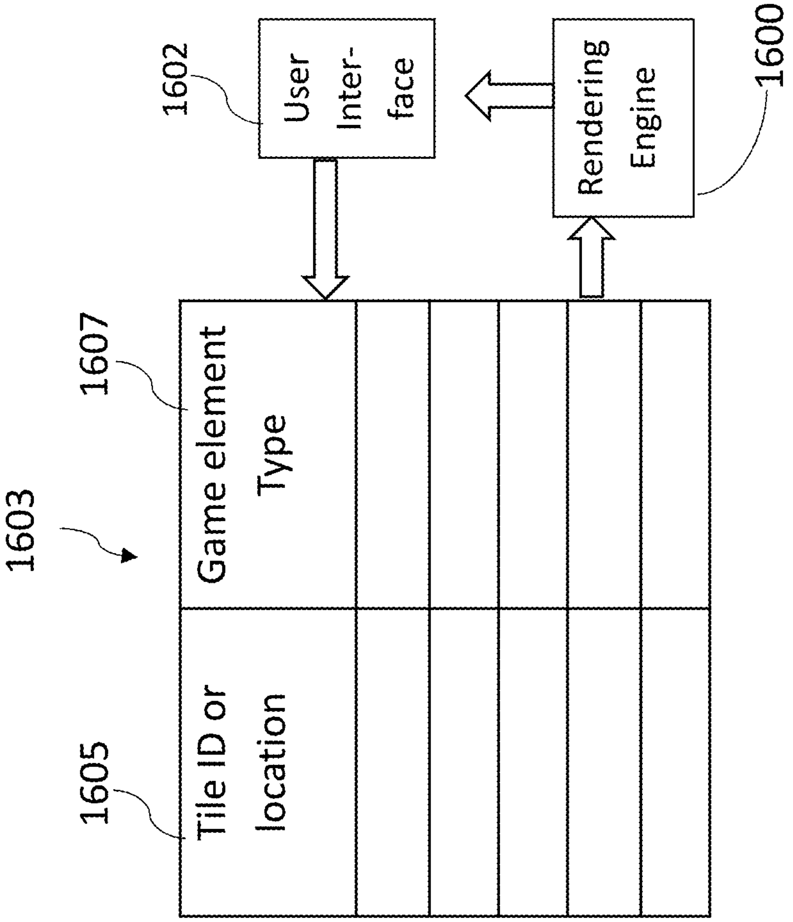
FIG. 7 schematically shows a data structure for managing game element data, showing the interrelation between the data structure and a rendering engine of a graphics controller.

FIG. 7 illustrates an example of a data structure 1603 which is responsible for controlling the game board displayed. FIG. 7 schematically illustrates the interrelation between the data structure 1603 and a rendering engine 1600 of the graphics controller 125. The graphics controller is in the user device as described previously. The data structure 1603 can be held in any suitable storage circuitry, such as in the memory of the user device, as described previously. The rendering engine 1600 drives the display on a user interface 1602.

The data structure 1603 is responsible for controlling the game board displayed. In this example, each location on the game board is associated with a tile identity (ID). This tile identity may be explicit or implicit from the location of the data in the table. Each game element has a game element ID 1605. Each game element ID will uniquely define a game element which may be a blocker, a booster or a game element of the first type. Each tile ID or location will be associated with one or more game element ID 1605. (In some embodiments, one or more game elements may overlie one or more other game elements.) The information in the table is used by the computer implemented game engine.

After each stage or round of the customization, the computer implemented game engine will update the data. The game board which is rendered by the rendering engine and displayed on the display will depend on the data in this table, in some embodiments.

Figure 8:
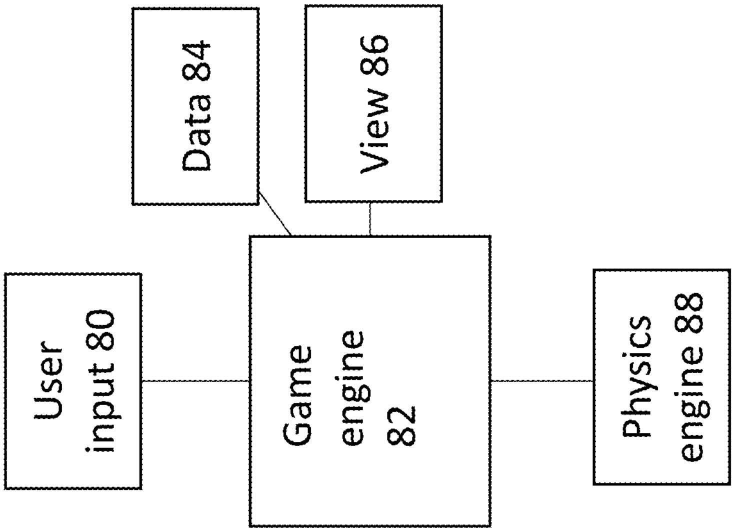
FIG. 8 is a schematic diagram showing the modules and functions provided by a user device and associated with carrying out the operating of embodiments.

Reference is made to FIG. 8 which schematically shows the functional blocks of an embodiment, which may enable game play such as discussed previously. This may be provided in the user device of FIG. 4. A user input block 80 is shown. This captures the user input received via the user interface and feeds the input to a game engine 82. In the context of the computer implemented game of some embodiments, this user input may be which game elements are switched by a user. This user input can be via any suitable user interface, such as discussed earlier. One or more of the functional blocks of FIG. 8 may be performed by at least one processor. The computer implemented game engine may be provided by at least one processor.

The computer implemented game engine 82 will process the information provided by the user input. The computer implemented game engine 82 (for example a game model) will determine if a valid combination has been made.

Each game element has data associated therewith. The data 84 may be stored in any suitable memory location. In some embodiments, the data may be provided by the data structure described previously. In some embodiments, the data may be considered to be part of the computer implemented game engine and in other embodiments may be considered to be outside the computer implemented game engine. The data may provide information as to the properties of the game element such as described previously. The data may include the position data, that is, information representing the position of the game element in the displayed image.

In some embodiments, the computer implemented game engine will check if a move made by the user causes the game elements to satisfy the rule or rules for a valid match. The rule or rules which define whether or not a match condition has been satisfied will be dependent on the computer implemented game. In some embodiments, a match condition will be satisfied if the game elements are arranged to provide a sequence or pattern of at least three adjacent first objects sharing at least one same characteristic.

Thus, the computer implemented game engine will be in control of the matching mechanism. The computer implemented game engine will have access to data for a game element including its position and will be able to determine if a match condition has been met.

It should be appreciated that in other embodiments, the computer implemented game may use any type of match mechanic such as switching, sliding, clicking or linking. The game elements may be any suitable game element.

A physics engine 808 is provided which is configured to control the movement of moving game elements on the display. The tiles are static is some embodiments. For example, the physics engine may control the movement of the game elements when the game board is replenished.

The physics engine 808 may be part of the computer implemented game engine 802.

A view function 806 uses of the data to provide the displayed image with which the user is able to view and/or interact.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the computer implemented game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device configured to provide a computer implemented game, the computer device comprising:

a display configured to display, a first plurality of selectable options, each option of the first plurality of selectable options associated with the providing of a plurality of game elements at defined positions on a game board of the computer implemented game;

a user interface configured to detect user input when a user selects one of the first plurality of selectable options, wherein each of the selectable options is associated with a booster game element and a blocker game element; and at least one processor configured, in response to the user input selecting one of the first plurality of selectable options, to provide the plurality of game elements associated with the selected option at the respective defined positions on the game board to provide a first game board, the first game board comprising the plurality of game elements associated with the selected option and a plurality of game elements of a first type.

2. The computer device as claimed in claim 1, wherein each of the selectable options is associated with a different blocking game element.

3. The computer device as claimed in claim 2, wherein a first of the selectable options is associated with a first number of a first blocking element and a second of the selectable options is associated with a second number of a second blocking element, the first number being different to the second number.

4. The computer device as claimed in claim 1, wherein the defined positions comprise a first set of defined positions and a second set of defined positions, a first one of the two different game elements of a respective selectable option being associated with the first set of defined positions and a second one of the two different game elements of the respective selectable option being associated with the second set of defined positions.

5. The computer device according to claim 1, wherein:

the at least one processor is configured to cause the display to display a second plurality of selectable options, each option of the second plurality of selectable options associated with the providing of a plurality of game elements at defined positions on a game board of a computer implemented game;

the user interface configured to detect user input when a user selects one of the second plurality of selectable options; and the at least one processor is configured, in response to the user input selecting one of the second plurality of selectable options, to provide the plurality of game elements associated with the selected option at the respective defined positions on the game board to provide a second game board comprising the plurality of game elements associated with the selected option of the first plurality of options, the plurality of game elements associated with the selected option of the second plurality of options, and a plurality of game elements of a first type.

6. The computer device as claimed in claim 5, wherein the first plurality of selectable options is different to the second plurality of selectable options.

7. The computer device as claimed in claim 5, wherein the defined positions associated with the first plurality of selectable options is different to the defined positions associated with the second plurality of selectable options.

8. The computer device as claimed in claim 1, wherein the defined positions are provided in a single block of tiles of the game board, the block comprising a plurality of tiles.

9. The computer device as claimed in claim 1, wherein the defined positions are provided in a plurality of blocks of tiles of the game board, each block comprising one or more tiles.

10. The computer device as claimed in claim 1, wherein the user interface is configured to detect user input when a user makes a move to play the computer implemented game on the first game board.

11. The computer device as claimed in claim 10, wherein the user interface is configured to detect user input selecting at least one game element on the game board to make a move, the at least one processor is configured to determine if the move satisfies a matching criteria and if so to remove one or more of game elements satisfying the matching criteria from the game board.

12. The computer device according to claim 1, wherein the first plurality of selectable options comprises a first round of customization of the game board, the at least one processor providing at least one round of customization, and allowing the game board to be played by a user only when the at least one round of customization has been completed.

13. The computer device according to claim 12, wherein two or more rounds of customization are provided.

14. The computer device according to claim 1, wherein the at least one processor is configured to cause the first game board to be sent to at least one other user.

15. The computer device according to claim 1, wherein the at least one processor is configured to cause the first game board to be saved in at least one memory and to allow the first game board to be replayed.

16. A computer implemented method provided by a computer device configured to provide a computer implemented game, the computer implemented method comprising:

displaying, by a display of the computer device, a first plurality of selectable options, each option of the first plurality of selectable options associated with the providing of a plurality of game elements at defined positions on a game board of the computer implemented game;

detecting, by a user interface of the computer device, user input when a user selects one of the first plurality of selectable options;

providing, by at least one processor of the computer device, in response to the user input selecting one of the first plurality of selectable options, the plurality of game elements associated with the selected option at the respective defined positions on the game board to provide a first game board, the first game board comprising the plurality of game elements associated with the selected option and a plurality of game elements of a first type;

detecting, by the user interface of the computer device, user input when a user selects at least one game element on the game board to make a move; and determining, by the at least one processor, if the move satisfies a matching criteria and if so removing one or more of game elements satisfying the matching criteria from the game board.

17. A computer implemented method provided by a computer device configured to provide a computer implemented game, the method comprising:

displaying, by a display of the computer device, a first plurality of selectable options, each option of the first plurality of selectable options associated with the providing of a plurality of game elements at defined positions on a game board of the computer implemented game;

detecting, by a user interface of the computer device, user input when a user selects one of the first plurality of selectable options;

providing, by at least one processor of the computer device, in response to the user input selecting one of the first plurality of selectable options, the plurality of game elements associated with the selected option at the respective defined positions on the game board to provide a first game board, the first game board comprising the plurality of game elements associated with the selected option and a plurality of game elements of a first type; and causing, by the at least one processor, the first game board to be sent to at least one other user.

* * * * *